Dec. 3, 1968　　　W. J. LARVA, SR., ET AL　　　3,414,027
PULPWOOD CUT-OFF APPARATUS
Filed Oct. 5, 1966　　　　　　　　　　　　　　　3 Sheets-Sheet 3

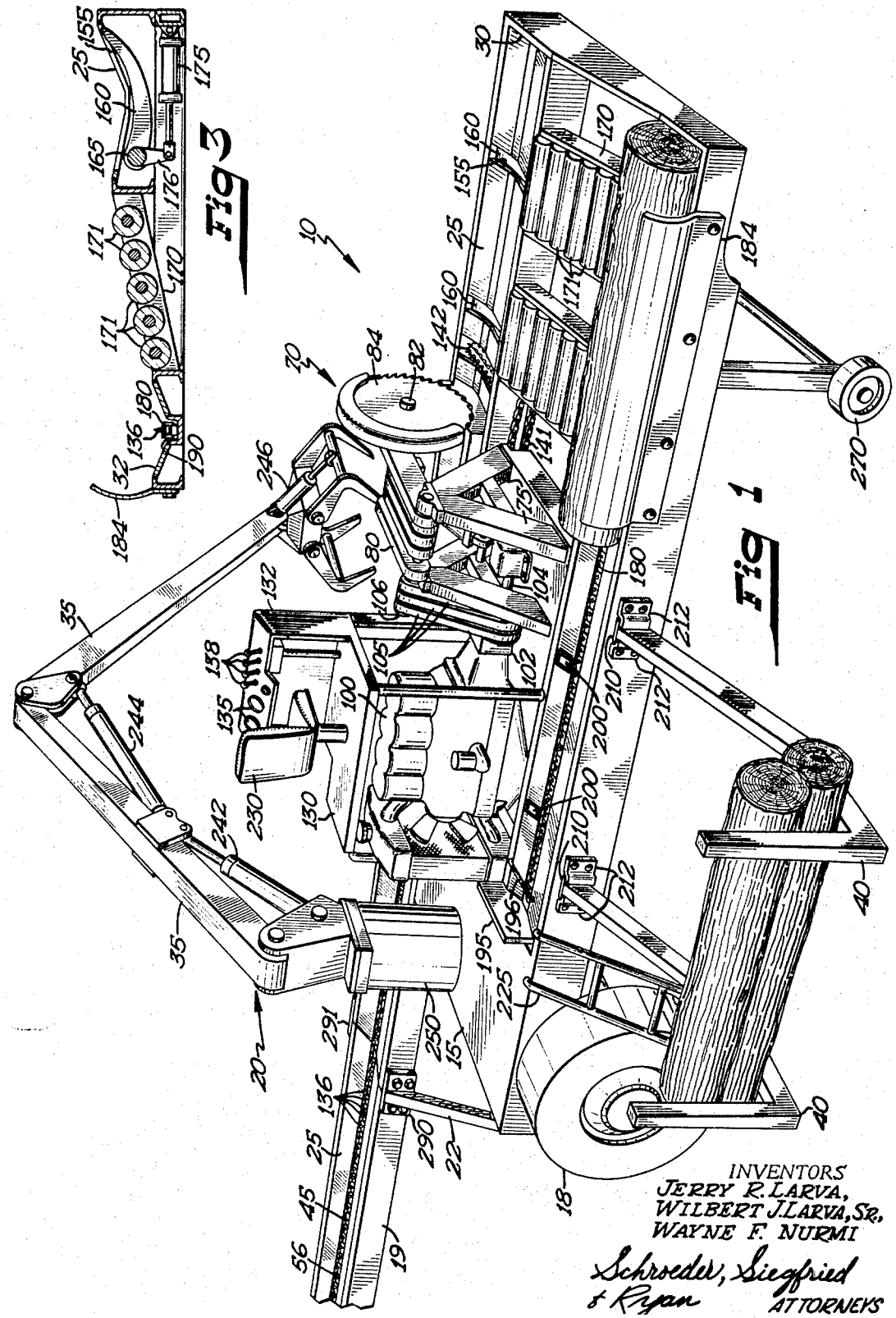

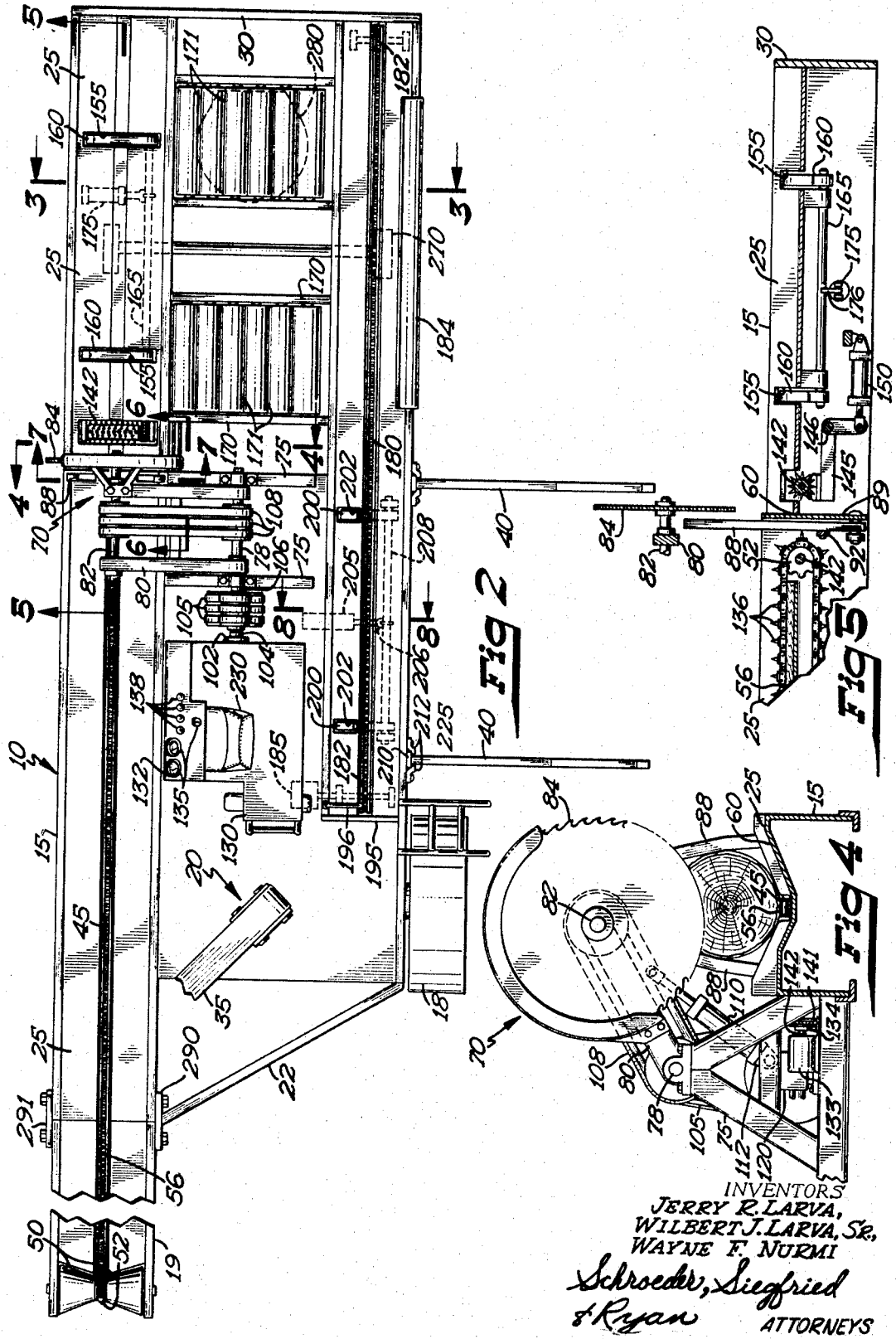

INVENTORS
JERRY R. LARVA,
WILBERT J. LARVA, SR,
WAYNE F. NURMI

Schroeder, Siegfried
 + Ryan　　ATTORNEYS

United States Patent Office 3,414,027
Patented Dec. 3, 1968

3,414,027
PULPWOOD CUT-OFF APPARATUS
Wilbert J. Larva, Sr., and Jerry R. Larva, both of Box 422, Floodwood, Minn. 55736, and Wayne F. Nurmi, Box 146, Meadowlands, Minn. 55765
Filed Oct. 5, 1966, Ser. No. 584,424
14 Claims. (Cl. 143—46)

The present invention is directed to a tree harvesting apparatus and more particularly to an improved logging machine designed to handle tree length logs to transport them to a severing or slashing saw for the purpose of cutting the tree length logs into predetermined lengths and transferring the cut logs into a stacked relationship off of the logging machine.

Tree harvesting apparatus and log feeding and sawing apparatus have taken varying forms to accomplish varying stages of tree harvesting operations. The present invention is directed to an improved logging machine particularly adapted for severing tree length logs into predetermined lengths and handling logs before and after the severing operation. Further this improved logging machine has its operating clam or loading derrick centrally located thereon such that it is capable of handling logs of varying sizes and in varying positions beside the machine with the particular application toward cutting and stacking of pulpwood and thereafter moving the stacked wood onto other vehicles. This improved tree harvesting or logging machine may be operated by a single operator to accomplish a log cutting and stacking operation and may be readily transported to a logging site for the purpose of performing the cutting, stacking and loading operation. Further this improved tree harvesting or logging machine is adapted to be powered from a conventional power supply and provide a hydraulic type control supply. It may also be transported with conventional tractor type draft equipment. In addition, a section of the same is demountable during transportation to reduce the overall length of the same consistent with highway vehicle regulations.

The improved logging machine includes an input and output conveyor. The input conveyor is divided into sections with a portion of the same being demountable to decrease the overall length of the machine. A saw is positioned on the machine frame to move toward and away from the logs on the input conveyor for the purpose of severing the same into predetermined lengths, and apparatus for transferring the logs to an output conveyor and a stacker is included on the machine. In addition, the improved logging machine includes a derrick for the purpose of handling both tree length and severed logs off of the machine. As such, it is capable of operation by a single operator to perform an entire handling operation in the cutting and stacking of logs, such as pulpwood.

Therefore it is the principal object of this invention to provide an improved logging machine.

Another object of this invention is to provide in an improved logging machine a simplified conveying apparatus and drive apparatus therefor together with an adjustable saw which will facilitate sawing of logs through the control of a single operator.

A further object of this invention is to provide a logging machine in which a loader or clam is so mounted thereon to be positioned adjacent the input conveyor and midway along the extent of the same while being adjacent the end of the output conveyor from which the logs are ejected such as to enable the loader or clam to readily place logs on the frame and handle ejected logs for loading purposes.

A still further object of this invention is to provide apparatus of this type which is portable and readily transportable on the highway.

Another object of this invention is to provide a logging machine of this type which is simple in design and economical to manufacture and easy to maintain.

These and other objects of this invention will become apparent from a reading of the attached description together with the drawings wherein:

FIGURE 1 is a perspective view of the improved logging machine,

FIGURE 2 is a top elevation view of the improved logging machine,

Figure 7:
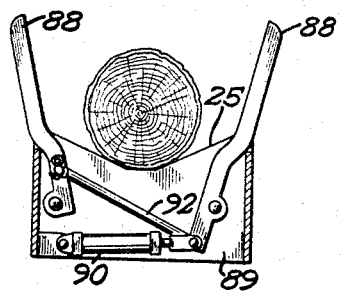
Figure 8:
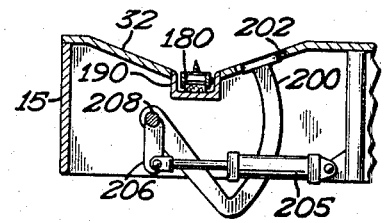
Figure 6:
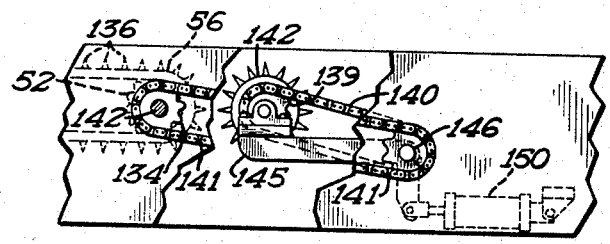
Figure 9:
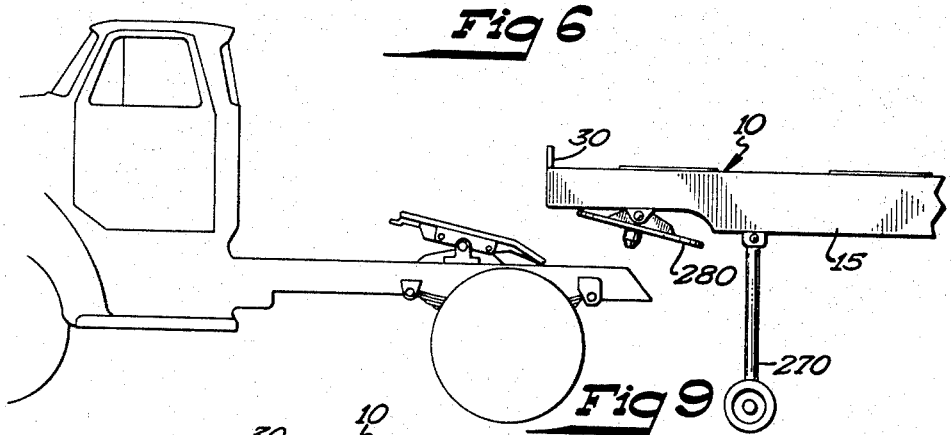
Figure 10:
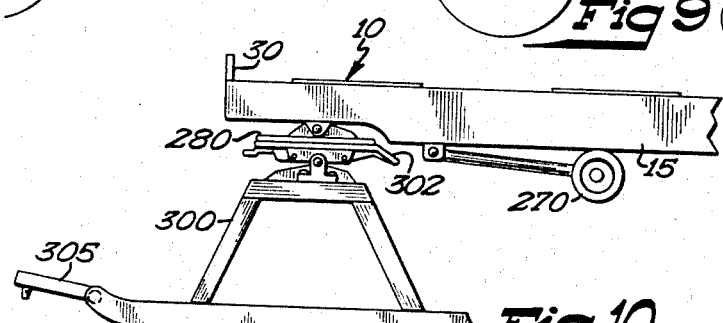

FIGURE 3 is a sectional view of the improved logging machine of FIGURE 2 taken along the lines 3—3 therein, with parts removed, FIGURE 4 is a sectional view of the improved logging machine of FIGURE 2 taken along the lines 4—4 therein, with parts broken away, FIGURE 5 is a sectional view of the improved logging machine of FIGURE 2 taken along the lines 5—5 therein, with parts removed, FIGURE 6 is a sectional view of the improved logging machine of FIGURE 2 taken along the lines 6—6 therein, FIGURE 7 is a sectional view of the improved logging machine of FIGURE 2 taken along lines 7—7 therein, FIGURE 8 is a sectional view of the improved logging machine of FIGURE 2 taken along the lines 8—8 therein, FIGURE 9 is a side elevation view of a portion of the improved logging machine showing the coupling thereon for moving the machine and a tractor type vehicle for transporting the same, and FIGURE 10 is a side elevation view of a portion of the improved logging machine showing a sled type support attached to the machine coupling to facilitate movement of the machine by other types of draft apparatus.

Our invention in an improved logging machine relates to a portable slasher or cutting machine which may be readily transported to a logging site to facilitate cutting logs of tree lengths into shorter predetermined lengths, such as pulpwood logs. This improved logging machine is shown in perspective in FIGURE 1 as incorporating generally a frame 10 with a derrick loader or clam 20 mounted thereon. The frame 10 is comprised of a main portion 15 which is generally rectangular in form and has a pair of fixed support wheels and an appropriate axle secured to one end of the same, as at 18. Projecting from the main portion 15 of the frame 10 is a secondary portion 19 which is suitably braced to the main frame through means such as support members, indicated generally at 22. The length of the secondary portion projects beyond the main frame and the wheel supports 18 and forms a bed of an input conveyor 25 which extends over the extent of the secondary portion and along one edge of the main frame through the extent of the same up to a raised flange 30 at the extremity opposite the wheel supports 18 which forms a stop member for logs thereon. On the opposite side of the main frame is positioned an output conveyor 32 which extends substantially over the length of the opposite side but does not extend to the end of the main frame terminating short of the wheel support members 18, as will be evident in FIGURES 1 and 2. The length of the secondary portion 19 of the frame approaches the length of the main frame so that the input conveyor bed is adapted to receive and hold tree length logs. The positioning of the loader derrick or clam at or near the end of the main frame with its associated elongated and pivoted boom members 35 is such that the derrick may conveniently load delimbed tree logs onto the input conveyor bed of varying lengths and may take severed logs from the output conveyor or an associated stacking frame 40, to be hereinafter described, and load the same from the frame onto trucks or sidings or the like. The clam or derrick loader has sufficient length to pick up tree length logs at their balance point from varying positions along the frame of the logging machine and spaced apart or aside from the logging machine and readily raise them onto the input conveyor bed. This eliminates the necessity of stacking the trees to be cut adjacent the conveyor in a predetermined relationship and thereby increases the versatility of the machine while reducing the time required to place fallen trees adjacent the same for severing or cutting purposes. Similarly, the clam may unload from the rack 40 since as will be hereinafter described, severed logs are directed on the output conveyor back toward the loading derrick on the main frame so that such logs will be in easy reach and the derrick will have sufficient length to easily load the severed logs, such as pulpwood, onto railroad cars, truck racks or into piles apart from the machine.

The input conveyor 25 and the output conveyor 32 are substantially the same in shape or cross-section as will be seen in FIGURES 3 and 4. Each of the conveyor beds is generally trough shaped in cross-section having downwardly sloped walls and a rectangular recess 45 in the center of the same. The secondary portion of the frame has only a portion of the input conveyor bed thereon with a pair of conically shaped rollers 50 connected by a sprocket 52 journaled in the end of the same. A mill chain 55 is positioned over the sprocket so as to drive the conically shaped rollers and the mill chain is positioned in the recess 45 on the exposed or upper side of the bed of the conveyor extending along substantially the length of the input conveyor bed on the main frame to the cutoff point wherein the saw is located, as will be later described. Beyond this portion, the height of the input conveyor bed is dropped or lowered approximately several inches, as indicated at 60, in FIGURE 4 and the recess 45 is omitted. At the point where the bed is depressed or lowered, as indicated by 60, the cutoff saw, indicated generally at 70, is positioned. This saw is mounted on an A frame type structure 75 secured to the upper surface of the main frame 15 and intermediate the input and output conveyor beds. Two A frame type support structures suitably interconnected mount a supporting shaft 78 which pivotally mounts a pair of arms 80 carrying at their opposite extremity the support shaft 82 for the saw blade 84. The pivoted arms 80 supporting the shaft 82 and the blade 84 are adapted to be pivoted toward and away from the input bed vertically and slightly beyond the end of the main input conveyor bed so as to sever logs thereon with the severed portion of the logs dropping onto the lowered portion 60 of the conveyor bed. This will permit the logs as they are being sawed or slashed to drop at the free extremity opening of the cut made by the saw blade to eliminate pinching on the blade. Adjacent the end of the main portion of the input conveyor bed and ahead of the saw 84 are a pair of clamping arms 88 which are pivotally mounted on a suitable support 89 in the lower portion of the main frame below the surface thereof with the extremities of the clamping arms extending through slots in the input conveyor bed. These clamping arms are operated or pivoted by an actuator 90 through a linkage system 92 to cause the arms to pivot toward one another and grip a log on the input conveyor bed adjacent the saw. This will enable the log to be held securely as the saw is dropped through the same in the cutting operation.

Between the A frame structure 75 supporting the saw blade and the loading derrick 20 on the main frame is positioned the drive motor 100 which may be of the gasoline engine type. This drive motor is directly coupled through a clutch, indicated schematically at 102, and a pulley 104 to belting 105 leading to pulleys 106 on the shaft 78 to drive the shaft 78 and belts 108 connected thereon to rotate the shaft 82 of the saw blade. The actual saw structure is pivoted toward and away from the conveyor bed through an actuator 110 which is connected at one extremity through a clevis or flange 112 on the surface of the rotating shaft 82 mounting the saw blade. A stub shaft on the output of the main pulley 104 drives a hydraulic pump 120 having a closed hydraulic system associated therewith for the purpose, as will be later noted, of supplying hydraulic fluid under pressure to the various actuators on the logging machine.

Positioned above the drive engine 100 on the main frame is a platform 130 with a control pedestal 132 mounted thereon, the control pedestal having a suitable starting and meter equipment indicated at 135 together with control levers 138 which are attached through linkages to control valves (not shown) located below the main frame and connected in the hydraulic system to control the actuators of the various functions of the logging machine, as will be hereinafter defined.

One of the actuators of the logging machine is of the rotary type and is shown in phantom at 133 in FIGURE 4 as coupled to a second sprocket 134 for driving the mill chain 45 on the input conveyor. Sprocket 134 and its shaft is coupled to mill chain 45 through a chain 141 to a sprocket 144 mounting the mill chain 45 at the end of the input conveyor remote from rollers 50 and sprocket 52. The mill chain 45 has lugs, such as is indicated at 136, to grip the surface of the log and move the same in the trough shaped conveyor bed. Also coupled to the motor 133 at the sprocket 134 and driven simultaneously with mill chain 45 is a second sprocket 139 and chain 140, the sprocket 139 being mounted on the supporting shaft of a spiked roller 142. The shaft of roller 142 is journaled in the sides of the input conveyor bed beyond the saw through suitable journaling means (not shown). This structure is pivotally mounted through a linkage 145 pivoted as at 146 in FIGURE 6 to be actuated by a motor 150 for the purpose of raising and lowering the spiked roller relative to the input conveyor bed to aid in the severing of the logs at the saw. The spiked roller is continuously rolling with the mill chain 45 being controlled by the motor 133 so as to convey the logs whenever the saw is elevated through the lower portion of the trough or bed 60 and against the stop end 30 prior to the cutting operation. Whenever the saw is to be operated, the input conveyor drive for the mill chain 45 and the spiked roller 142 are stopped, but the roller may be elevated by the operator through operation of actuator 150 to aid in the cutting operation.

In this portion of the input conveyor bed beyond the saw, the mill chain is eliminated and the spiked roller also serves for moving the logs thereon. Suitable slots 155 placed in this portion of the conveyor bed permit the mounting and pivotal movement of a pair of ejector arms 160 which are mounted on a common shaft 165, as shown in FIGURE 3 and operated through an actuator 175 and a crank 176 to pivot the arms together for the purpose of lifting a log out of the input conveyor bed after the same has been severed by the saw. As will be evident in FIGURE 3, the input conveyor bed is positioned at an elevation on the main frame higher than the output conveyor bed and the area in between the same on the surface of the main frame may include inclined bars 170 with rollers 171 attached thereto to facilitate transporting or rolling of the severed and ejected logs from the main conveyor bed to the output conveyor bed. The rollers which are free rolling may be omitted, if desired.

In the output conveyor bed 32 is also positioned a mill chain 180 with suitable sprockets, shown in phantom at 182, at the extremities of the same to provide for a continuous chain rotated in the recess 190 of the about conveyor bed. Adjacent that portion of the output conveyor bed common to the roller structure and the area receiving the severed logs is an upstanding flange or stop member 184 which engages the logs to insure that they remain in the output conveyor bed after they are ejected from the input conveyor bed or cutoff portion thereof. The output conveyor or its mill chain 180 is substantially identical in form but is shorter in length than the mill chain on the input conveyor bed. It is driven through a suitable rotary hydraulic motor, shown in phantom at 185 coupled into the hydraulic system and as will be later noted is normally continuously operating. At the extremity of the output conveyor bed is positioned a stop member 195 and a sensor 196. This structure is located adjacent the engine and short of the extent of the main portion of the frame. Also included in the conveyor bed at this point are a pair of ejector flanges or arms 200 which are generally C-shaped in form and have a portion sticking through a slot 202 in the bed surface with suitable actuator means 205 and crank 206 to pivot the actuator or ejector arms 200 on a common shaft 208 for the purpose of raising or moving a severed log off of the output conveyor bed and the main frame. Stacking rack 40 is located at this point, this rack being in the form of a pair of L-shaped arms connected through flanged extremities 210 to flanges 212 on the side of the main frame to locate the same. This permits removal of the rack arms from the machine whenever they are not in use, such as for transportation purposes. This portion of the structure may be removed, if desired and the trough portion of the same modified to be tilted in the direction of the stacking frame 40 to permit the severed logs at this point to roll off under the force of gravity. Whenever the ejector arms 200 are used, the sensing rod 195 will operate an associated valving (not shown) to automatically operate the actuator 205 to move the arms 200 and eject a log before the stop portion 195 is engaged.

In addition to the above, as shown in FIGURE 1, the frame may also include a suitable ladder 225 to facilitate entrance and exist of an operator to and from the surface of the main frame and to the control level thereon. In addition, the control platform 130 may include a seat 230 or seats (only one of which is shown) to facilitate positioning of the operator before the control panel for operation of the controls of the logging machine. As will be seen in FIGURE 1, the loading derrick includes hydraulic actuators 242, 244 and 246 which move the lever or boom arms of the derrick and open and close the clam jaws thereof for the purpose of stretching the derrick to pick up logs and load the same on the machine or remove severed logs from the bins if desired. In addition, the derrick through its central supporting shaft (not shown) positioned within the support column 250 and includes a rotary drive motor (not shown) to rotate the derrick or boom as over a distance of approximately 400 angular degrees. This will facilitate movement of the boom from one side to the other of the logging machine to permit an operator to pick up tree length logs and place the same on the input conveyor or remove severed logs from the bin adjacent to the output conveyor.

The front end of the main frame 15 includes a pair of pivoted support wheels 270 which may be elevated or pivoted to a raised position during transport and lowered to a vertical position for supporting this end of the main frame when the machine is at work. Such adjustment of the wheels 270 is provided through a suitable crank system (not shown) and is conventional with trailer type equipment. In addition, this portion of the frame includes the conventional pivot coupling or fifth wheel, indicated in phantom at 280, on the undersurface of the main frame to adapt the same to be connected to tractor truck type equipment for transport purposes. As will be seen in FIGURES 1 and 2, a portion of the secondary frame 19 is broken or disconectable from the remaining portion of the frame and secured thereto through suitable plates 290, 291 so that this portion of the secondary frame may be removed for transport purposes. Under such conditions, the mill chain will be opened through a master link and removed. The logging machine may also be provided with a suitable skid 300 having a pivoted disc wheel plate or covering plate 302 attached thereon to fit into the fifth wheel coupling 280 for supporting the same and to permit movement of the logging machine in the woods through suitable tractor type draft equipment such as bulldozers. A tie linkage or two bar linkage 305 on the sled permits such a coupling. Under such conditions the front support wheels 270 may or may not be positioned in the down position.

Our improved logging machine will greatly improve the handling of logs to be severed in the woods at a logging site for the purpose of cutting delimbered tree trunks, that is, tree length logs, into predetermined log lengths. As such, the improved logging machine is clearly adapted for pulpwood type operations. With a single or dual operator, the loading derrick is so positioned on the frame of the logging machine that it may readily pick up tree length logs regardless of their positioning beside the logging machine and grasp the same at a balance point so that they may readily be placed on the input panel conveyor. One of the plurality of control levers 138 (not all of which are shown at 132) will facilitate engaging of the proper valve and energization of the rotary hydraulic actuator 133 to drive the mill chain located therein together with the rollers 50, 52, at the end of the same. This will facilitate movement of the log along the conveyor bed with the saw 70 elevated until the stop 30 is reached. At this point the mill chain movement and roller 142 is stopped. During this period of time the spike roller is rotated with the mill chain 45 since it is coupled to the mill chain drive motor of the input conveyor. Roller 142 may be elevated through its associated actuator 150 to assist in movement of the logs over the portion of the input conveyor bed beyond the saw so that the end of the log will engage the stop. With stopping of the input conveyor, the actuator 90 through a control handle operating its valve will be actuated to move the clamping arms 88 into position around the butt of the log adjacent the saw to steady the same. With the log so engaged, the actuator 110 for the pivot structure of the saw is operated to rotate the saw down on the log. The use of the clamping structure is optional depending upon whether it is desired to steady the log during the sawing operation. As the saw is passed through the log, the severed end will drop onto the lowered portion of the input conveyor bed. At this time the saw will be elevated by operating its actuator 110 to raise the pivot and support structure for the same. It will be understood during this time, the engine operating the pump 120 will have been continuously operating and the saw continuously rotating through the belt system and the direct drive from the engine. A suitable guard is positioned over the blade on the upper surface thereof in a conventional manner. With the saw blade elevated, the actuator 175 for the ejector arms 155 will be operated to raise the log such that it rolls on the rollers or bars to the output conveyor. The stop 184 insures that the log will be positioned in the output conveyor and the mill chain drive for the output conveyor will normally be continuously operating so that the log will move back in the vicinity of the loader derrick and clam. With the automatically operated ejecting arms in the output conveyor, the presence of the log at the sensor 196 will operate through a suitable valve control to energize the actuator 205 for the same, raising the log and dropping the same into the bin. The output conveyor may be left running continuously since the logs thereon after being removed from the input conveyor will be automatically ejected from the logging machine. With the severing operation of the first log completed, and the saw blade raised, the input conveyor is started again to move the new portion of the tree trunk on the input conveyor to the stop. Thus the tree trunk may be cut into predetermined log lengths through a very simplified operation of merely starting and stopping the input conveyor, operating the clamping device, if necessary, and moving the saw blade into and out of the same together with ejection of the severed log from that portion of the input conveyor beyond the saw blade. The single operator may operate the loader derrick in addition to place new tree length logs on the input conveyor as the succeeding one is cut or a second operator may perform this function. The bin is also located in proximity with the loading derrick or clam so that the operator may readily remove the logs therefrom and onto a suitable trailer unit or in a stacker relationship apart from the machine as desired. This improved logging machine locates the loader derrick relative to the active input conveyor so that tree length logs may be picked up from various locations beside the logging machine without requiring that they be accurately placed adjacent the same. Further the range or distance of movement of the input derrick is such that it enables the operator to seek and find the balance point on a log so that the same may be safely raised to the input conveyor for loading on the machine. Thus, logs may be raised from various positions beside the machine to be loaded thereon for cutting purposes. Similarly the same loading derrick may be utilized for removal of logs from the bin and stacking or loading on trucks.

This inmproved logging machine utilizes the tractor portion of a conventional tractor trailer unit as a draft device for transporting the same over highways. Under such conditions the removable portion of the input conveyor will be released and properly loaded or stacked on the machine to decrease the overall length of the same and keep it within limits of load lengths on highways. In addition, the sled 300 will normally be placed under the same whenever the tractor draft unit is removed at at working site. This will permit movement of the machine to spot it at various points along the logging site through other conventional draft devices, such as bulldozers. This arrangement frees the tractor trailer combination so that the tractor trailer unit may be readily used for transporting pulpwood away from the machine and the tractor portion of the same may be used for transporting the entire machine between logging sites and on highways. Similarly the loading derrick is of such length and is so positioned that the separate logs in the bin may be readily raised and mounted on the trailer unit of a truck by the operator of the machine without requiring auxiliary help.

In considering this invention it should be remembered that the present disclosure is intended to be illustrative only and the scope of the invention should be determined by the appended claims.

What is claimed is:

1. A logging machine comprising, a main frame, at least a pair of wheel means mounting the main frame for rolling movement, coupling means included on the frame and adapted to be connected to a draft means for moving the frame, an input conveyor bed having conveyor means therein positioned along the extent of the frame and on one side thereof, stop means positioned at one end of the input conveyor bed and the frame, cut-off saw means positioned on the main frame adjacent the input conveyor bed and spaced from the stop means for pivotal movement toward and away from the conveyor bed, clam means positioned on the frame adjacent the extent of the input conveyor bed and midway along the same between said other end of the frame and the saw means, means positioned between the stop means and the saw means for raising cut-off logs from the input conveyor bed and positioning the logs relative thereto, an output conveyor bed having a conveyor means therein positioned on the frame parallel to the input conveyor bed and on the opposite side thereof on the frame, means positioned between the input conveyor bed and output conveyor bed on the main frame and adapted to receive logs from the input conveyor bed and transport them to the output conveyor bed, means positioned remote from said one end of said frame and in part on said output conveyor bed to remove logs therefrom, motor means for operating the conveyor means in the input and output conveyor beds together with the saw means and the positioning means and the clam, and individual control means connected to and controlling the operation of said last named motor means and including a console means mounting the same positioned on the main frame between the input and output conveyor beds.

2. The logging machine of claim 1 and including a clamping means positioned in the input conveyor bed adjacent the saw means and adapted to be raised thereon to engage logs on the input conveyor bed during a severing operation by the saw means.

3. The logging machine of claim 2 in which the means positioned between the input and output conveyor beds on the main frame are roller means adapted to receive the logs from the input conveyor bed and transport them to the output conveyor bed and in which the means positioned remote from said one end of said frame and included in part in the output conveyor bed is an ejector means, and including control means for operating the ejector means connected to the motor means for operating the same.

4. The logging machine of claim 3 in which the means positioned between the stop means and the saw means and the ejector means in the output conveyor bed are pivoted arms pivotally mounted on the main frame and pivotally actuated through hydraulic actuators to engage logs in the respective beds and move them from the respective beds and in which the control means include separate control valves operating the hydraulic actuators which are operatively connected to and operated by control handles mounted in the console means.

5. The logging machine of claim 4 in which the motor means includes a plurality of linear and rotary hydraulic actuators and a power source driving a rotary pump to supply fluid for energizing the actuators with a belt drive from the power source for driving the saw means, said motor means operating respectively the conveying means in the input and output conveyor beds, the clamping means, the clam means, the pivoted arms for the ejector and positioning means and a pivoting actuator for the saw means.

6. The logging means of claim 1 in which the clam means is positioned midway along the extent of the input conveyor beds having the conveying means therein and is located adjacent the extremity of the output conveyor bed remote from the end of said frame such that the clam means may move logs onto the input conveyor bed and from an area adjacent the frame and the ejector means in the output conveyor bed.

7. The logging machine of claim 2 in which each of the input and output conveyor beds includes a trough like frame and a continuous mill chain positioned in the base of the trough like frame and driven to engage the logs and move them in the beds.

8. The logging machine of claim 7 in which the input conveyor bed is elevated on the frame above the output conveyor bed and on opposite sides thereof.

9. The logging machine of claim 8 in which the input conveyor bed between the saw means and the stop means is positioned at a lower elevation then the remaining portion of the input conveyor bed.

10. The logging machine of claim 9 in which the saw means is a rotating saw blade journaled in a free extremity of a pivoted arm and driven thereon with the pivoted arm being pivotally moved toward and away from the input conveyor bed.

11. A logging machine of claim 10 in which the input conveyor bed includes a portion extending beyond a remaining portion of the frame which is disconnectable from the remaining portion of the frame for transportation purposes.

12. The logging machine of claim 11 in which at least a pair of the wheel means are mounted under the remaining portion of the frame to support the same remote from said one end and adjacent the portion of the input conveying bed extending beyond the frame and the coupling means includes a pivotal connection adapted to support the said one end of the logging machine on a draft means.

13. The logging machine of claim 12 and including means detachable from the main frame adjacent the output conveyor bed to receive logs ejected therefrom and stack the same.

14. The logging machine of claim 9 and including a drive roller having spikes thereon positioned between the portions of the input conveying bed at different elevations to affect transfer of logs therebetween.

References Cited

UNITED STATES PATENTS

| | | | |
|---|---|---|---|
| 2,988,116 | 6/1961 | Neumann | 143—46 |
| 3,275,046 | 9/1966 | Moyers et al. | 143—46 |

WILLIAM S. LAWSON, *Primary Examiner*.